(12) United States Patent
Andreis et al.

(10) Patent No.: US 11,236,744 B2
(45) Date of Patent: Feb. 1, 2022

(54) HYDRAULIC PUMP AND RESPECTIVE MULTIFUNCTION VALVE

(71) Applicant: FLUID-O-TECH S.R.L., Corsico (IT)

(72) Inventors: Francesco Andreis, Milan (IT); Roberto Zuppi, Rho (IT); Stefano Copelli, Cormano (IT)

(73) Assignee: Fluid-O-Tech, S.r.l., Corsico (IT)

( * ) Notice: Subject to any disclaimer, the term of this patent is extended or adjusted under 35 U.S.C. 154(b) by 606 days.

(21) Appl. No.: 15/635,577

(22) Filed: Jun. 28, 2017

(65) Prior Publication Data
US 2018/0010598 A1    Jan. 11, 2018

(30) Foreign Application Priority Data

Jul. 5, 2016 (IT) .......................... 202016000069965

(51) Int. Cl.
*F04B 49/24* (2006.01)
*F16K 17/04* (2006.01)
(Continued)

(52) U.S. Cl.
CPC .............. *F04B 49/24* (2013.01); *F04C 28/26* (2013.01); *F04C 28/28* (2013.01); *F16K 17/04* (2013.01);
(Continued)

(58) Field of Classification Search
CPC ........ F04B 49/24; F16K 17/38; F16K 31/002; F16K 17/04; G05D 7/0126; F04C 28/28;
(Continued)

(56) References Cited

U.S. PATENT DOCUMENTS

| 3,146,720 A | 9/1964 | Henry |
| 4,249,558 A * | 2/1981 | Clifford ................ F15B 21/045 |
| | | 137/115.03 |

(Continued)

FOREIGN PATENT DOCUMENTS

| DE | 102014203085 | 8/2015 |
| EP | 2840284 | 2/2015 |

(Continued)

*Primary Examiner* — Peter J Bertheaud
*Assistant Examiner* — Geoffrey S Lee
(74) *Attorney, Agent, or Firm* — Stites & Harbison, PLLC; Trevor T. Graves (57) ABSTRACT

A hydraulic pump is described, comprising at least one inlet duct for a fluid, at least one outlet duct for the fluid and at least one pumping unit interposed between the inlet and outlet ducts. At least one multifunction valve is interposed between the inlet duct, upstream of the pumping unit, and the outlet duct, downstream of the pumping unit, which valve is configured to divert the flow of fluid from the inlet duct to the outlet duct without the fluid flowing into the pumping unit. The multifunction valve comprises a valve body that defines an inner bypass channel in which a shutter element is axially movable, an actuator member operatively associated with the shutter element and configured to move it from a closing position to an opening position of the bypass channel, and an elastic contrast element operatively associated with the shutter element and configured to keep it in the first closing position of the bypass channel when such shutter element is not actuated by the actuator member. The actuator member consists of a bias spring manufactured with a shape memory alloy, configured to move the shutter element from the first closing position to the second opening position of the bypass channel when a predefined temperature value is reached.

13 Claims, 6 Drawing Sheets

(51) Int. Cl.
*F16K 31/00* (2006.01)
*F16K 17/38* (2006.01)
*F04C 28/26* (2006.01)
*F04C 28/28* (2006.01)
*G05D 7/01* (2006.01)
*F04C 14/26* (2006.01)
*F04C 14/28* (2006.01)
*F04C 28/24* (2006.01)
*F04C 14/24* (2006.01)

(52) U.S. Cl.
CPC ............ *F16K 17/38* (2013.01); *F16K 31/002* (2013.01); *G05D 7/0126* (2013.01); *F04C 14/24* (2013.01); *F04C 14/26* (2013.01); *F04C 14/28* (2013.01); *F04C 28/24* (2013.01); *F04C 2270/185* (2013.01); *F04C 2270/195* (2013.01)

(58) Field of Classification Search
CPC .......... F04C 28/26; F04C 14/24; F04C 14/28; F04C 28/24; F04C 2270/195; F04C 2270/185; F04C 14/26
See application file for complete search history.

(56) References Cited

U.S. PATENT DOCUMENTS

| | | | | |
|---|---|---|---|---|
| 4,523,605 A * | 6/1985 | Ohkata | ...................... | E03B 7/12 116/218 |
| 4,859,155 A * | 8/1989 | Laqua | ...................... | F04B 49/24 417/307 |
| 5,462,413 A * | 10/1995 | Schroeder | ............... | F04B 49/24 137/543.23 |
| 7,971,601 B2 * | 7/2011 | Lum | ...................... | F16K 31/002 137/337 |
| 8,434,510 B2 * | 5/2013 | Lum | ...................... | F16K 31/002 137/337 |
| 9,133,952 B2 * | 9/2015 | Lamb | ...................... | F16K 11/044 |
| 9,170,584 B2 * | 10/2015 | Lum | ...................... | F16K 31/002 |
| 9,945,283 B2 * | 4/2018 | Muizelaar | ................. | F01P 7/14 |
| 10,317,918 B2 * | 6/2019 | Gao | ...................... | G05D 23/1852 |
| 2006/0108435 A1 * | 5/2006 | Kozdras | ............. | G05D 23/1333 236/93 R |
| 2009/0007972 A1 * | 1/2009 | Lum | ...................... | G05D 23/02 137/468 |
| 2009/0110571 A1 * | 4/2009 | Kim | ...................... | B60T 8/4031 417/313 |
| 2010/0213401 A1 | 8/2010 | Martin et al. | | |
| 2011/0259445 A1 * | 10/2011 | Lum | ...................... | G05D 23/02 137/468 |
| 2011/0315903 A1 * | 12/2011 | Sohn | ...................... | F03G 7/065 251/11 |
| 2012/0247582 A1 * | 10/2012 | Lamb | ...................... | F16K 11/044 137/468 |
| 2013/0240053 A1 * | 9/2013 | Lum | ...................... | G05D 23/02 137/115.01 |
| 2013/0277039 A1 * | 10/2013 | Scott | ...................... | F28F 27/00 165/287 |
| 2015/0233465 A1 * | 8/2015 | Gao | ...................... | F16H 57/0413 236/34.5 |
| 2016/0281585 A1 * | 9/2016 | Muizelaar | ............. | F16K 31/042 |
| 2017/0344036 A1 * | 11/2017 | Gao | ...................... | G05D 23/1333 |
| 2018/0010598 A1 * | 1/2018 | Andreis | ...................... | G05D 7/0126 |

FOREIGN PATENT DOCUMENTS

| | | |
|---|---|---|
| GB | 2243188 | 10/1991 |
| WO | WO9512069 | 5/1995 |
| WO | WO02090807 | 11/2002 |

* cited by examiner

HYDRAULIC PUMP AND RESPECTIVE MULTIFUNCTION VALVE

This application claims the benefit of Italian Patent Application Ser. No. 202016000069965, filed Jul. 5, 2016, the disclosure of which is incorporated herein by reference.

The present invention relates in general to a hydraulic pump and more specifically, to a multifunction valve for a hydraulic pump.

As is known, a thermal bypass valve is a valve used in a pump or in a generic hydraulic circuit for diverting a flow of fluid when a specific temperature is reached. Thermal bypass valves are used in several applications, such as for example heating systems, cooling systems, etc. Usually, thermal bypass valves are provided with actuator devices manufactured with so called "low-melting" metal alloys, i.e. metal alloys that melt at temperatures below 150° C.

Again according to the known art, a overpressure valve is a valve configured to keep under control the pressure inside a pump or a generic hydraulic circuit. Under normal operating conditions, the overpressure valve remains closed. The actuator device of the valve is calibrated to a predefined pressure value. When the pressure of the fluid contained in the pump or in the hydraulic circuit exceeds the aforesaid predefined pressure value, the valve opens, thus allowing the passage of the fluid and reducing the pressure in the pump or the hydraulic circuit.

Finally, check or non-return valves are known which, when they are applied inside a pump or a generic hydraulic circuit, allow the flow of a fluid in one direction alone. The actuator device of a check valve or a non-return valve may consist of e.g. a spring mechanism. The valve opens if the pressure of the inlet fluid is greater than the pressure of the outlet fluid combined with the elastic force of the spring.

In a pump or generic hydraulic circuit therefore, all three types of valves mentioned above may be provided. These valves are normally independent from one another and each of them consists of components that are usually separate from the components of the other valves. Accordingly, the pump or the hydraulic circuit that includes all three types of valves mentioned above may be cumbersome and complex.

It is therefore the general object of the present invention to make a hydraulic pump, and more specifically, a multifunction valve for a hydraulic pump which is capable of resolving the drawbacks mentioned above of the prior art in a manner which is highly simple, cheaper and particularly functional.

In detail, it is an object of the present invention to make a multifunction valve for a hydraulic pump which is capable of integrating, in a single component, the functionalities of three valves according to the prior art, i.e. a thermal bypass valve, an overpressure valve and a check or non-return valve.

It is another object of the invention to make a multifunction valve for a hydraulic pump which is capable of protecting both the inner components of the pump and the devices placed upstream and downstream of such pump, from overtemperatures.

These and other objects according to the present invention are achieved by making a hydraulic pump and a respective multifunction valve as disclosed in claim 1.

Further features of the invention are apparent from the dependent claims, which are an integral part of the present description.

The features and advantages of a hydraulic pump and a respective multifunction valve according to the present invention will be more apparent from the following description, which is to be understood as exemplifying and not limiting, with reference to the schematic attached drawings, wherein.

It is worth noting that in the accompanying drawings and in the following description, several components of the hydraulic pump will not be mentioned and/or illustrated because they are well-known components to a person skilled in the art.

Figure 1:
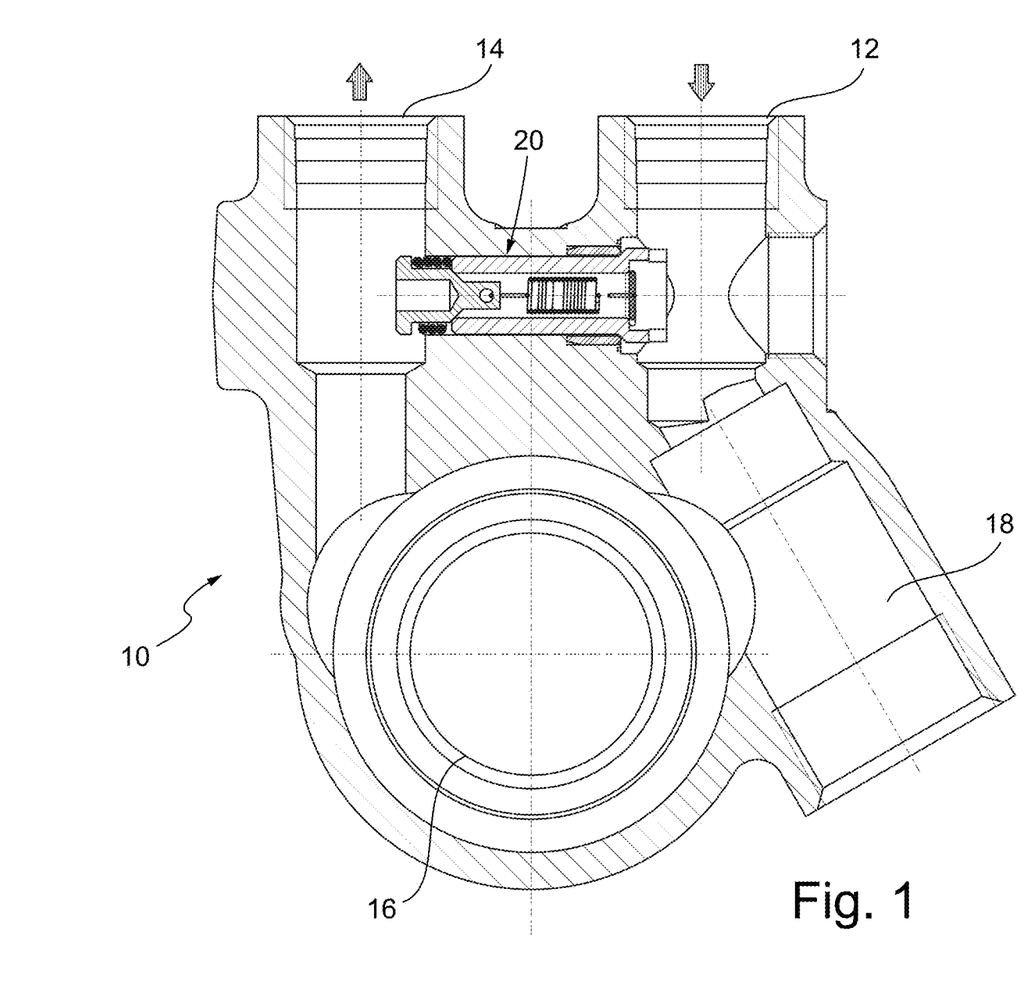
FIG. 1 is a sectional view of a first example embodiment of a hydraulic pump according to the present invention.

With reference in particular to FIG. 1, a hydraulic pump according to the present invention is shown, indicated globally with numeral 10. The hydraulic pump 10 comprises at least one inlet duct 12 for a fluid and at least one outlet duct 14 for such fluid. At least one pumping unit 16 is interposed between the inlet duct 12 for the fluid and the outlet duct 14 for the fluid. A filter 18 for the fluid may also be interposed between the inlet duct 12 for the fluid and the pumping unit 16.

The hydraulic pump 10 may consist of, for example, a displacement pump in which the pumping unit 16 comprises a pair of gears. Alternatively, the hydraulic pump 10 could consist of a piston displacement pump. The hydraulic pump 10 may in any case consist also of other types of pumps, not necessarily displacement pumps, such as e.g. a rotary vane pump.

Irrespective of the type of hydraulic pump 10, at least one multifunction valve 20 is interposed between the inlet duct 12 for the fluid, upstream of the pumping unit 16, and the outlet duct 14 for the fluid, downstream of the pumping unit 16. Under specific operating conditions of the hydraulic pump 10, the multifunction valve 20 is configured to divert the flow of fluid from the inlet duct 12 to the outlet duct 14 without such fluid flowing into the pumping unit 16.

Figure 2:
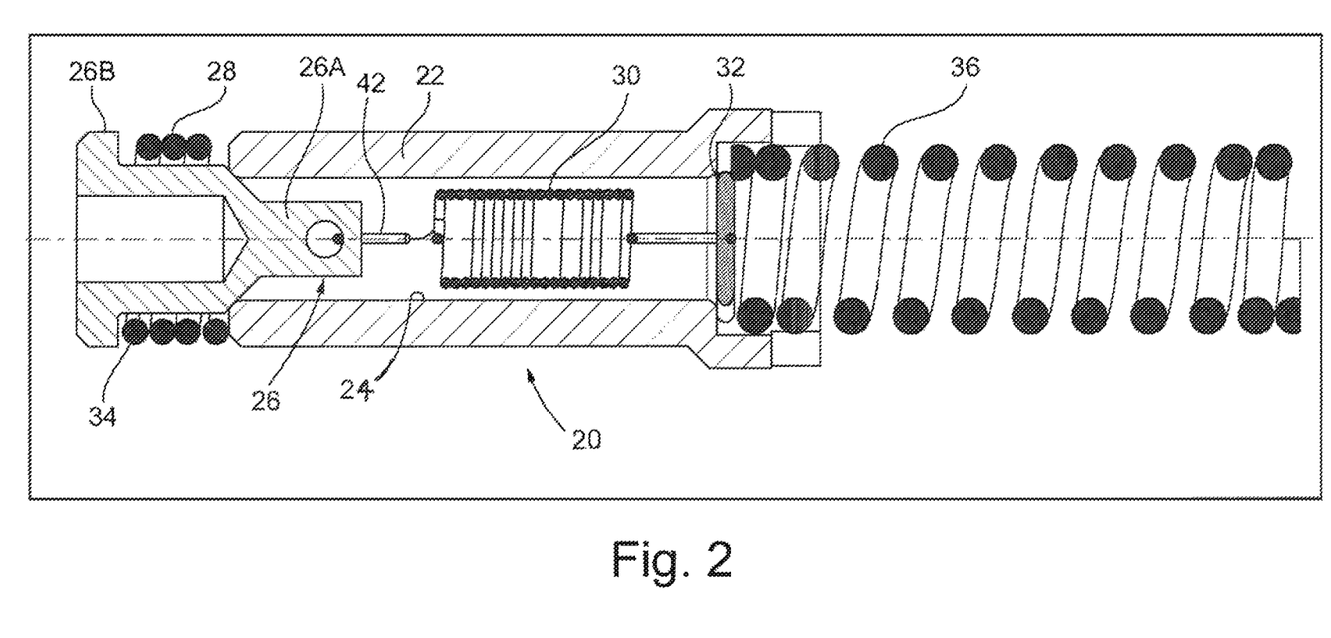
FIG. 2 is a sectional view of a multifunction valve belonging to the hydraulic pump in FIG. 1.
Figure 3:
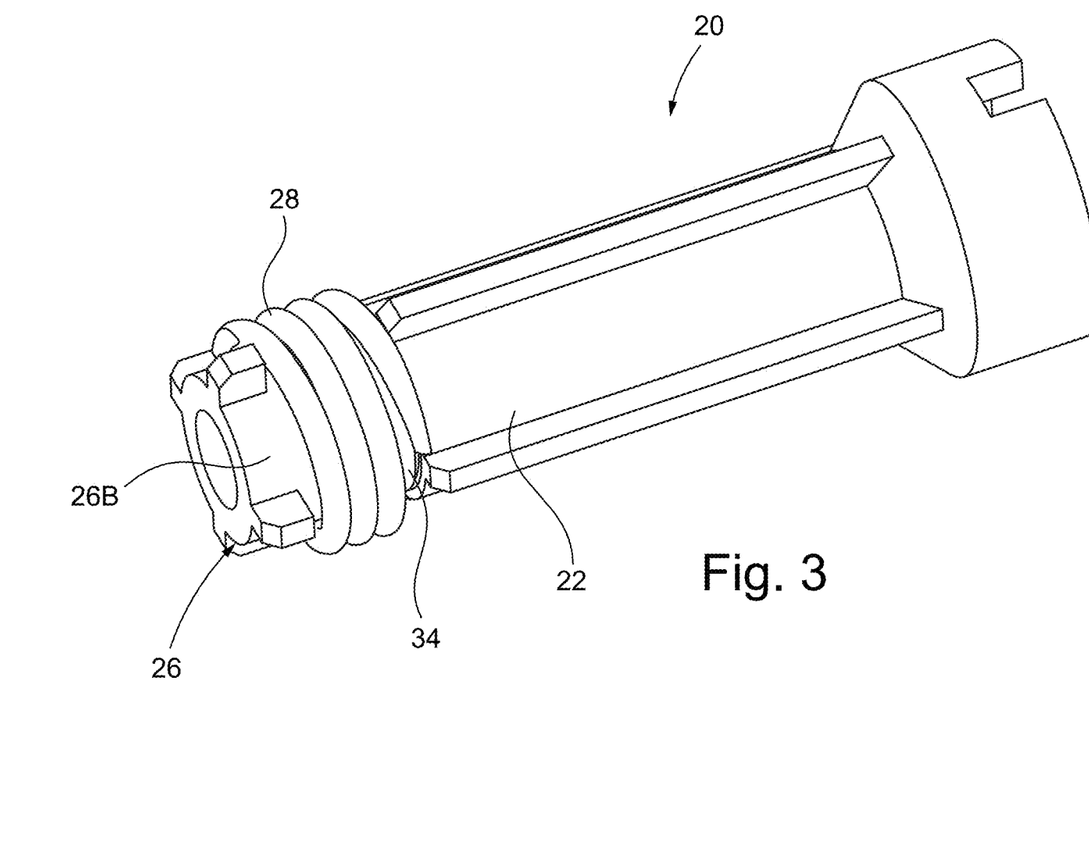
FIG. 3 is a perspective view of the multifunction valve of FIG. 2.
Figure 4:
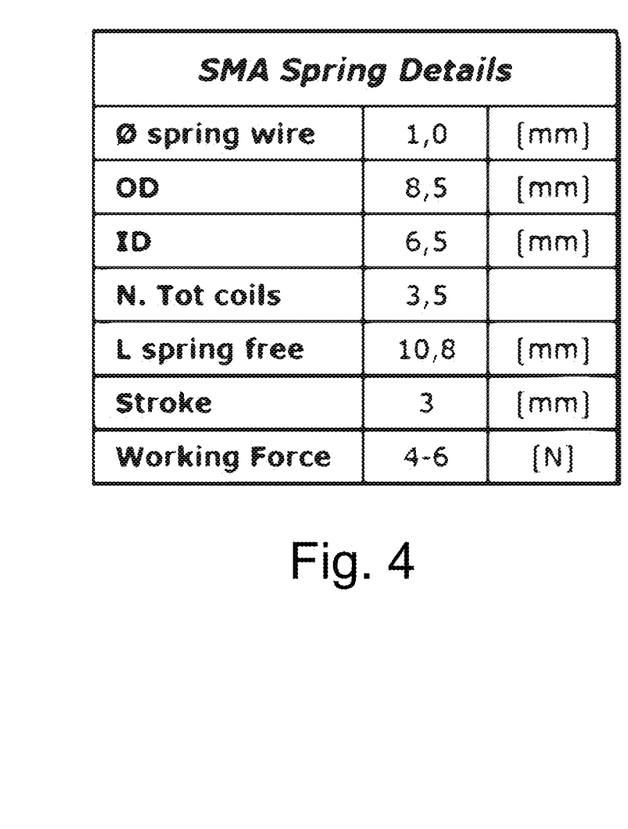
FIGS. 4 and 5 show respectively a table and a graph containing the technical features of a preferred example embodiment of the multifunction valve of FIG. 2.

As shown in FIGS. 2 and 3, the multifunction valve 20 comprises a valve body 22, manufactured typically with metal or with a technopolymer. The valve body 22 defines an internal bypass channel 24 inside which at least one shutter element 26 is axially movable. The shutter element 26 is preferably mushroom-shaped, with an inner portion 26A configured to be introduced into the bypass channel 24 and to occlude selectively such bypass channel 24, and an outer portion 26B having a larger cross section than the cross section of the inner portion 26A. Also the shutter element 26 may be manufactured with metal or with a technopolymer.

The multifunction valve 20 is provided with at least one actuator member 28 operatively associated with the respective shutter element 26 and configured to move such shutter element 26 from a first closing position of the bypass channel 24 of the multifunction valve 20 to a second opening position of such bypass channel 24 of the multifunction valve 20. FIGS. 2 and 3 show the multifunction valve 20 in the first closing position thereof.

The multifunction valve 20 is also provided with at least one elastic contrast element 30 operatively associated with a respective shutter element 26 and configured to keep such shutter element 26 in the first closing position of the bypass channel 24 of the multifunction valve 20 when the shutter element 26 itself is not actuated by the respective actuator member 28. Preferably, the elastic contrast element 30 consists of a bias spring operating by traction.

The contrast spring 30 is preloaded with a predefined force and is provided with a first constraining point with respect to the valve body 22, and with a second constraining point with respect to the shutter element 26. As shown in FIG. 2, the first constraining point may consist of a first S-shaped hook 32, fixed on one side on a wall of such valve body 22, and on the other side to the contrast spring 30. The second constraining point may instead consist of a second hook 42 fixed on one side to the inner portion 26A of the shutter element 26 and on the other side to the contrast spring 30.

Figure 7:
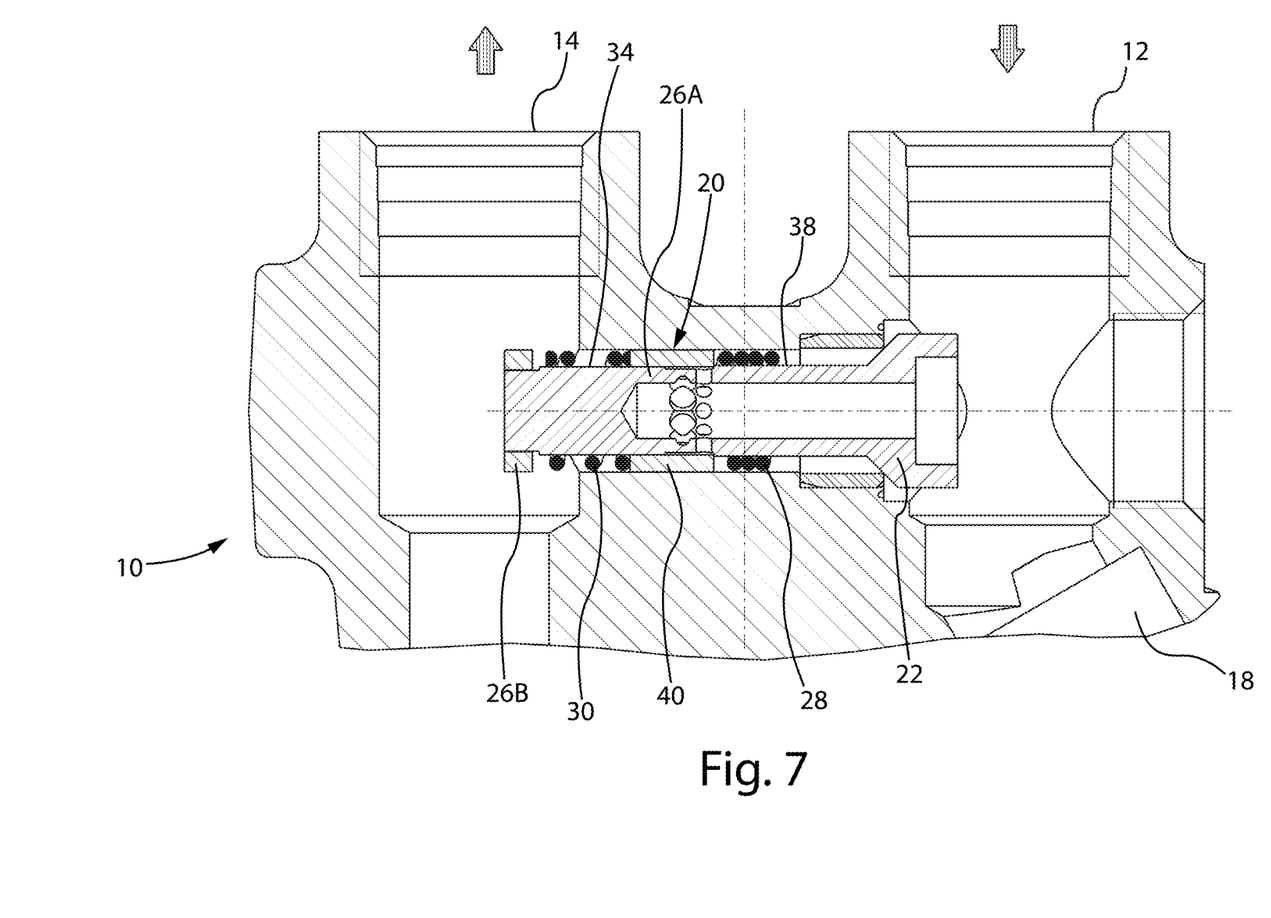
FIG. 7 is a sectional view of second example embodiment of a hydraulic pump according to the present invention.

As shown instead in FIG. 7, the first constraining point may consist of a ring 40 which is integral with the valve body 22. In the example embodiment of FIG. 7, indeed the contrast spring 30 is housed outside the multifunction valve 20, in a corresponding annular seat 34 obtained about the outer portion 26B of the shutter element 26.

Advantageously, the actuator member 28 consists of a bias spring manufactured with a shape memory alloy (SMA). As shown in the example embodiment of FIG. 3, the SMA spring 28 is housed outside the multifunction valve 20, in a corresponding annular seat 34 obtained about the outer portion 26B of the shutter element 26. In the example embodiment of FIG. 7, the SMA spring 28 is again housed outside the multifunction valve 20, but in a different annular seat 38 obtained about the valve body 22.

Figure 5:
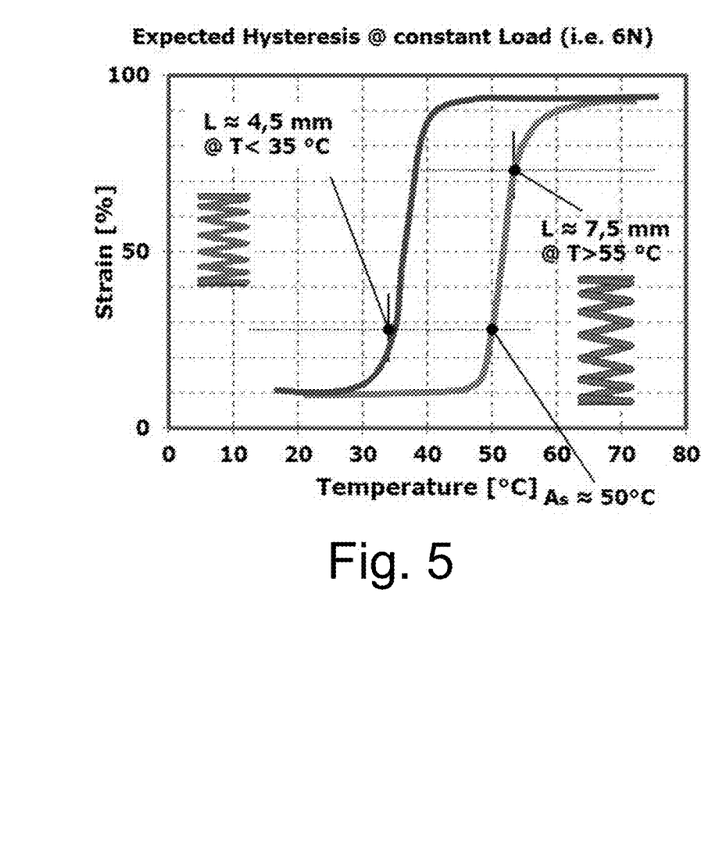
Figure 6:
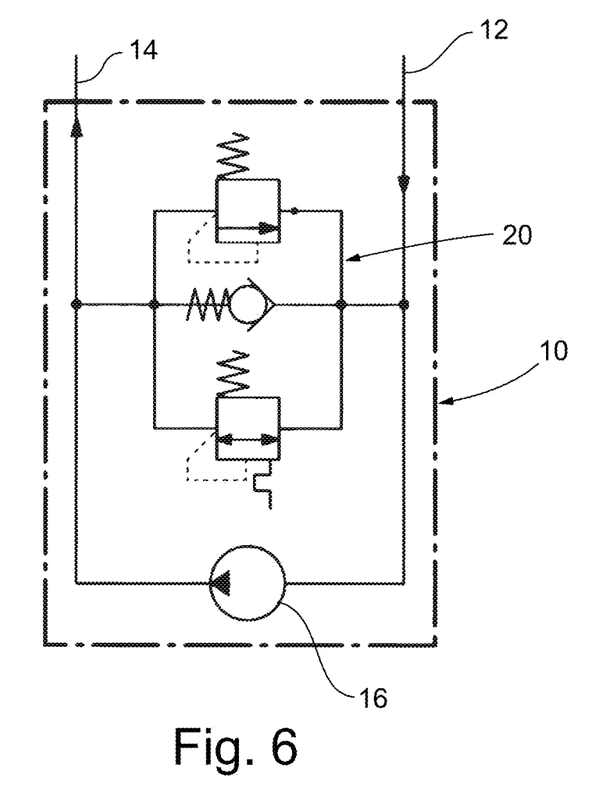
FIG. 6 is a schematic view of the hydraulic circuit of the hydraulic pump of FIG. 1, in which the possible operating modes of the multifunction valve of FIG. 2 are noted.

At room temperature, the SMA spring 28 has no effect, whereby the shutter element 26 remains in the first closing position of the bypass channel 24 of the multifunction valve 20, held by the respective contrast spring 30. When the temperature increases up to reaching a predefined temperature value, indicated for example in the graph of FIG. 5, the SMA spring 28 extends, overcoming the load developed by the contrast spring 30. Under this condition, the multifunction valve 20 is brought into the second opening position thereof, with the shutter element 26 open, to allow the fluid to cross the bypass channel 24 of the multifunction valve 20 itself.

The opening of the multifunction valve 20 allows increasing the passage section of the fluid in the hydraulic pump 10. Increasing the passage section decreases the temperature of the fluid, thus preserving the inner components of the hydraulic pump 10 and the devices placed upstream and downstream of such hydraulic pump 10. The multifunction valve 20 operates therefore as a thermal bypass valve, independently of the operating pressure of the hydraulic pump 10.

In addition to the function of thermal bypass valve, the multifunction valve 20 may also operate as overpressure control valve. In this case, the opening of the shutter element 26 is controlled by the reaching of a predefined pressure of the fluid circulating in the inlet duct 12 of the hydraulic pump 10. In other words, the opening of the shutter element 26 is obtained when the pressure of the fluid circulating inside the inlet duct 12 of the hydraulic pump 10 is greater than the predefined preloading force of the contrast spring 30 of the multifunction valve 20.

The multifunction valve 20 may finally operate also as check or non-return valve. In this case, the opening of the multifunction valve 20 is obtained when the pressure of the fluid circulating inside the inlet duct 12 of the hydraulic pump 10 is less than the sum of the pressure of the fluid circulating inside the outlet duct 14 of such hydraulic pump 10 and of the predefined preloading force of a bypass spring 36 of the multifunction valve 20.

The multifunction valve 20 according to the present invention may therefore be associated with displacement and non-displacement hydraulic pumps 10 equipped or not equipped with overpressure devices. The multifunction valve 20 may serve the function both of protecting the hydraulic pump 10 from overtemperatures, and also the devices placed upstream and downstream of such hydraulic pump 10, and of intervening when the temperature of the fluid and/or of the hydraulic pump 10 exceeds the predefined temperature value set for the opening of the SMA spring 28, for example due to the effect of the hydraulic power or external agents.

The multifunction valve 20 opens a circuit adapted to reduce the hydraulic power of the hydraulic pump 10, which otherwise would contribute to the increase in temperature due to the dissipative effect. The multifunction valve 20 also serves the function of protecting both the inner components and the outer components of the hydraulic pump 10 from potential damage caused by the raising of the temperature. The multifunction valve 20 also serves a function of reducing the power required by the shaft of the hydraulic pump 10 in case of overtemperature by accordingly reducing the potential overtemperatures transferred by the motor.

The multifunction valve 20 reduces the negative effects caused by the cavitation in the fluid which would be triggered at the high temperatures. The reduction of the maximum operating temperatures allows the use, inside and outside the hydraulic pump 10, of materials with lower performance at the high temperatures and therefore that are reasonably more cheaper.

It has thus been seen that the multifunction valve for a hydraulic pump according to the present invention achieves the objects previously noted, by obtaining in particular the following advantages:

- integrating three functions (thermal bypass valve, overpressure valve and passage valve from the inlet duct to the outlet duct, without pump in rotation, when the pressure in the inlet duct is greater than the pressure in the outlet duct) in a single component;
- effectiveness/universality: the functions that generally are performed by three different valves or devices are concentrated in a single component;
- preliminary action: the multifunction valve may be controlled automatically so that it may come into operation at the most convenient time;
- preventive action: the multifunction valve is capable of compensating for a potential low reliability of the hydraulic pump which would occur in the case of overtemperature or overpressure;
- the functions of the multifunction valve are automatically provided with feedback and self-adapt to the variations of the operating/surrounding conditions;
- the multifunction valve meets the need to protect the hydraulic pump and the circuit connected thereto from overtemperatures of the fluid;
- the multifunction valve resolves the volume problems which would otherwise exist in the technical solutions with separate valves.

The multifunction valve for a hydraulic pump thus conceived is susceptible in any case to numerous modifications and variants, all falling within the same innovative concept; moreover, all the details can be replaced by technically equivalent elements. Practically, the materials used, as well as their shapes and sizes, can be of any type according to the technical requirements.

The scope of protection of the invention is therefore defined by the appended claims.

The invention claimed is:

1. A hydraulic pump (10) comprising at least one inlet duct (12) for a fluid, at least one outlet duct (14) for the fluid and at least one pumping unit (16) interposed between the inlet duct (12) and the outlet duct (14), wherein between the inlet duct (12), upstream of the pumping unit (16), and the outlet duct (14), downstream of the pumping unit (16), at least one multifunction valve (20) is interposed, which is configured to divert the flow of fluid from the inlet duct (12) to the outlet duct (14) without the fluid flowing into the pumping unit (16), the at least one multifunction valve (20), comprising:
 a valve body (22) which defines an internal bypass channel (24) inside which a shutter element (26) is axially movable, wherein the shutter element is positioned at one end of the valve body;
 at least one actuator member (28) operatively associated with the shutter element (26) and configured to move the shutter element (26) from a first closing position of the bypass channel (24) to a second opening position of the bypass channel (24); and
 at least one elastic contrast element (30) operatively associated with the shutter element (26) and configured to keep the shutter element (26) in the first closing position of the bypass channel (24) when the shutter element (26) is not actuated by a respective actuator member (28),
the hydraulic pump (10) being characterized in that said at least one actuator member (28) consists of a bias spring manufactured with a shape memory alloy, configured to move the shutter element (26) from the first closing position of the bypass channel (24) to the second opening position of the bypass channel (24) when a predefined temperature value is exceeded, wherein said multifunction valve (20) operates independently of the operating pressure of said hydraulic pump (10).

2. The hydraulic pump (10) according to claim 1, characterized in that the shutter element (26) is mushroom-shaped, with an inner portion (26A) configured to be introduced into the bypass channel (24) and to occlude selectively the bypass channel (24), and an outer portion (26B) having a larger cross section than the cross section of the inner portion (26A) such that said outer portion (26B) is not positioned within the bypass channel (24).

3. The hydraulic pump (10) according to claim 2, characterized in that the elastic contrast element (30) consists of a bias spring operating by traction, preloaded with a predefined force, said bias contrast spring (30) being configured to control the opening of the shutter element (26) when the pressure of the fluid circulating inside the inlet duct (12) is greater than said predefined preloading force.

4. The hydraulic pump (10) according to claim 2, characterized in that the at least one elastic contrast element (30) consists of a bias contrast spring (30), the bias contrast spring (30) is provided with a first constraining point with respect to the valve body (22), and with a second constraining point with respect to the shutter element (26).

5. The hydraulic pump (10) according to claim 4, characterized in that the first constraining point consists of a first S-shaped hook (32), fixed on one side on a wall of the valve body (22) and on the other side to the bias contrast spring (30), while the second constraining point consists of a second hook (42) fixed on one side to the inner portion (26A) of the shutter element (26) and on the other side to the bias contrast spring (30).

6. The hydraulic pump (10) according to claim 4, characterized in that the bias contrast spring (30) is housed outside the multifunction valve (20), in a corresponding annular seat (34) obtained about the outer portion (26B) of the shutter element (26), and in that the first constraining point consists of a ring (40) which is integral with the valve body (22).

7. The hydraulic pump (10) according to claim 2, characterized in that the bias spring (28) manufactured with a shape memory alloy is housed outside the multifunction valve (20), in a corresponding annular seat (34) obtained about the outer portion (26B) of the shutter element (26).

8. The hydraulic pump (10) according to claim 4, characterized in that the bias spring (28) manufactured with a shape memory alloy is housed outside the multifunction valve (20), in a corresponding annular seat (38) obtained about the valve body (22).

9. The hydraulic pump (10) according to claim 1, characterized in that the valve body (22) is manufactured with a material selected in the group consisting of a metal and a technopolymer.

10. The hydraulic pump (10) according to claim 1, characterized in that the shutter element (26) is manufactured with a material selected in the group consisting of a metal and a technopolymer.

11. The hydraulic pump (10) according to claim 1, characterized in that a filter (18) for the fluid is interposed between the inlet duct (12) for the fluid and the pumping unit (16).

12. The hydraulic pump (10) according to claim 1, characterized in that the multifunction valve (20) is provided with a bypass spring (36) configured to open said multifunction valve (20) when the pressure of the fluid circulating inside the inlet duct (12) is lower than the sum of the pressure of the fluid circulating inside the outlet duct (14) and the predefined preloading force of said bypass spring (36).

13. The hydraulic pump (10) according to claim 1, characterized in that the multifunction valve (20) further operates as a check or non-return valve.

* * * * *